UNITED STATES PATENT OFFICE.

CHARLES EMMANUEL YVONNEAU, OF PARIS, FRANCE.

PROCESS OF PREPARING CALCIUM CARBID.

SPECIFICATION forming part of Letters Patent No. 648,349, dated April 24, 1900.

Application filed June 30, 1898. Serial No. 684,871. (No specimens.)

*To all whom it may concern:*

Be it known that I, CHARLES EMMANUEL YVONNEAU, a citizen of the Republic of France, residing at Paris, France, have invented certain new and useful Improvements in the Treatment of Carburet of Calcium, of which the following is a specification.

The present invention relates to a new and improved method of treating carbid of calcium to obtain a superior product having the general characteristics of the ordinary carbid—that is to say, which will develop acetylene gas in the presence of water or other aqueous liquid. The new product is much handier in use than the ordinary commercial carbid and is, furthermore, superior, and herein lies one of its distinct features of novelty in that it is decomposed by the water in proportion only as the same penetrates into it. Another important feature of the carbid is that it ceases generating gas immediately it is removed from the water, which is attained by providing the carbid with a sheathing or protective coating, as hereinafter described.

A further object of the invention is to facilitate the use of the improved carbid for the various purposes to which it may be applied by manufacturing the same preferably in the form of prismatic and cylindrical bodies with a sheathing, as above referred to, whereby when exposed to the atmosphere the carbid is unaffected by a hygroscopic state of the same. These and other features will be fully explained in the course of the following description.

The carbid is obtained in the following manner:

First. I heat in a receptacle of any preferred construction adapted to be heated by water-steam and provided with an agitator sixteen parts of glucose and four parts of a fatty body, such as any oil. I do not confine myself to any particular fatty substance or oil nor to the proportions herein stated, as the same are dependent on the saccharine substance employed, the above-indicated proportions being used to obtain one hundred parts of the product. The bodies are then heated to 100° centigrade and thoroughly agitated, so as to form a perfectly-homogeneous mass.

Second. The calcium carbid is crushed and eighty parts thereof, more or less, are heated to a suitable degree of temperature, such as about 300° centigrade. The object of thus heating the crushed carbid is to drive off the moisture in the carbid and to facilitate the combination between the carbid and the constituents of the agglomerative mixture.

Third. The small fragments of carbid are introduced when hot into the mixture of glucose and oil mentioned under step 1, said mixture being kept boiling above 100° centigrade. The mixing produces a boiling up or effervescence of the substances, which are gradually transformed into a mixture possessing a radically-different nature from said substances. This effervescence is not the result of the vapors contained in the glucose endeavoring to free themselves from the mass, which would be the natural supposition, because the glucose, having been previously heated to 100°, does not contain any watery vapors and may be considered perfectly free from water. Moreover, were there any watery vapors present in the mixture acetylene gas would be developed, which is not the case. When the mixture is perfectly homogeneous and while still hot—that is to say, in a plastic state—it can be molded into any suitable size and shape, according to the class of apparatus with which it is intended to be used, as—for instance, manufacturing or private gas-generating plants, acetylene-gas-generating lamps, and the like. The forms most preferred are solid prisms, cylinders, and the like. In manufacturing these bodies the amount of carbid compressed in each always corresponds to a certain unit of the production of gas which is desired. The sticks of carbid thus prepared are coated with a suitable hydrofuge, which when dry is impervious to moisture and even if brought into contact with water would dissolve very slowly. The carbid cannot be attacked directly by the water and is similarly proof against water-vapors and a hygroscopic state of the atmosphere. Thus the carbid is rendered more durable. The decomposition of the carbid is so weak or retarded that it is practically odorless.

While the ordinary carbid cannot with facility be broken into pieces of the requisite size, the new product, on the contrary, offers no difficulty in this direction, as it can be prepared in blocks of any dimensions, as above stated, ready for immediate use.

The production of gas from the use of my carbid is very regular and a noticeable feature is the absence of quick intermittent overproductions so frequent at present. The residuum is very slight, and thereby the use of cumbersome apparatus is avoided.

One of the principal advantages of the carbid resides in the fact that after it has been removed from the water the generation of gas ceases immediately. This is very important.

Having thus described my invention, I claim—

1. As an improvement in the process of preparing calcium carbid, crushing the carbid and then heating such crushed carbid as and for the purpose described, and then combining the heated carbid with a hot liquid agglomerative mixture indecomposable by the carbid and molding the resultant plastic mass into bodies of suitable shape.

2. As an improvement in the process of preparing calcium carbid, crushing the carbid and heating it and then combining the heated carbid with a heated mixture of glucose and an oily substance, and molding the plastic mass into bodies of suitable shape.

3. The process herein disclosed, which consists in crushing carbid of calcium, heating about eighty parts thereof and introducing the same into a mixture composed of sixteen parts of glucose and four parts of an oily substance, more or less, which mixture has been previously heated, and thereafter molding the mass into bodies of appropriate shape, substantially as and for the purpose set forth.

4. The process of preparing calcium carbid, which consists in mixing carbid in a comminuted state heated to about 300° centigrade with an agglomerative mixture heated above 100° centigrade and forming the resultant plastic mass into bodies of any desired shape, substantially as described.

5. The process herein disclosed, which consists in crushing carbid of calcium, heating about eighty parts of the same and introducing this into a heated mixture composed of sixteen parts of glucose and four parts of an oily substance, more or less, molding the mass into bodies of appropriate shape and coating said bodies with a suitable protective medium impervious to moisture and which will dissolve slowly when brought into contact with water, substantially as described and for the purpose set forth.

In testimony whereof I have hereunto signed my name, in presence of two subscribing witnesses, this 13th day of June, 1898.

CHARLES EMMANUEL YVONNEAU.

Witnesses:
 EDWARD P. MACLEAN,
 JOHN S. ABERCROMBIE.